United States Patent Office 3,269,992
Patented August 30, 1966

3,269,992
ORGANOBORON POLYMERS AND METHOD OF PREPARATION
Joseph Green and Nathan Mayes, Dover, N.J., assignors to Thiokol Chemical Corporation, Bristol, Pa., a corporation of Delaware
No Drawing. Filed Nov. 29, 1960, Ser. No. 72,527
8 Claims. (Cl. 260—80)

This invention relates to organoboron compounds and to a method for their preparation. The organoboron compounds are polymers prepared by heating in the presence of a catalytic amount of a Lewis acid a compound of the class

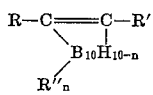

wherein R and R' are each hydrogen, alkyl radicals, or alkenyl radicals, at least one of R and R' being an alkenyl radical and the total number of carbon atoms in R and R' being from 2 to 8, R'' is a lower alkyl radical and $n$ varies from 0 to 4.

Compounds of the above class can be prepared by the method described in application Serial No. 59,460, filed September 29, 1960, of Jack Bobinski, Marvin M. Fein and Nathan Mayes. For example, C-isopropenylvinylenedecaborane of the formula

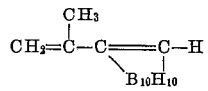

can be prepared by heating isopropenyl acetylene with bis(acetonitrilo) decaborane in benzene at 50° C. for 24 hours.

The Lewis acids include, for example, aluminum trichloride, aluminum tribromide, boron trifluoride, boron trichloride, ferric chloride, ferric bromide, zinc chloride, stannic chloride, antimony pentachloride and titanium tetrachloride.

The reaction can or need not be carried out in the presence of an inert hydrocarbon solvent. Such solvents include aliphatic hydrocarbon solvents such as n-pentane, hexane and heptane, aromatic hydrocarbon solvents such as benzene, toluene and xylene, and cycloaliphatic solvents such as cyclohexane and methylcyclohexane.

The ratio of organoboron compound to Lewis acid can be varied widely, generally being in the range 20 to 10 moles of organoboron compound per mole of Lewis acid, preferably 10 to 1. The amount of solvent can also vary widely but is generally within the range of 0 to 3 moles of solvent per mole of organoboron compound. The reaction temperature can vary from 150° to 450° C. and the pressure can vary from subatmospheric to several atmospheres, i.e. from 0 to 10 atmospheres. Polymerization generally requires about 24 to 72 hours depending upon the ratio of catalyst to monomer and the temperature and pressure utilized.

The process of the invention is illustrated in detail by the following examples.

Example I 15.0 grams of C-isopropenylvinylenedecaborane and 0.99 gram of anhydrous aluminum chloride were heated together in an evacuated sealed glass tube at 160° C. for 72 hours. The tube contents became increasingly more viscous with reaction time and when cooled set up to a tough pliable solid. Trituration of a 5 gram portion of the solid with n-heptane yielded 2.6 grams of a heptane insoluble powder and 2.2 grams of heptane soluble liquid. The powder, after reprecipitation from benzene, softened above 300° C. and its molecular weight, determined cryoscopically, was 1030. The molecular weight of the liquid fraction was 250–260. It was probably a mixture of monomer (M.W. 186) and low polymer. The infrared spectrum of the solid showed only a trace of C=C absorption while that of the liquid showed a large monomer component.

Example II 1.0 gram of C-isopropenylvinylenedecaborane was heated with 0.066 gram of anhydrous aluminum chloride and 1 milliliter of benzene in an evacuated sealed glass bulb at 150°–160° C. for 42 hours. The reaction mixture was poured into n-heptane to yield 0.43 gram of heptane insoluble powder. The softening point and infrared spectrum of the powder corresponded closely with those of the solid obtained in Example I.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant composition, reference is made to U.S. Patent 2,622,277 to Bonnell and to U.S. Patent 2,646,596 to Thomas.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

We claim:
1. A method for the preparation of organoboron polymers which comprises polymerizing while in admixture with a catalytic amount of a Lewis acid selected from the group consisting of aluminum trichloride, aluminum tribromide, boron trifluoride, boron trichloride, ferric chloride, ferric bromide, zinc chloride, stannic chloride, antimony pentachloride and titanium tetrachloride a compound of the class

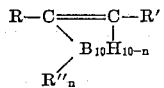

wherein R and R' are each selected from the class consisting of hydrogen, alkyl radicals and alkenyl radicals, at least one of R and R' being an alkenyl radical and the total number of carbon atoms in R and R' being from 2 to 8, R'' is a lower alkyl radical and $n$ varies from 0 to 4.

2. The method of claim 1 wherein the Lewis acid and the said compound are in admixture with an inert hydrocarbon solvent.

3. The method of claim 1 wherein the Lewis acid is aluminum trichloride.

4. The method of claim 1 wherein the said compound is C-isopropenylvinylenedecaborane of the formula

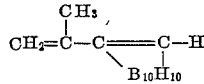

5. The method of claim 1 wherein the Lewis acid is aluminum trichloride and the said compound is C-isopropenylvinylenedecaborane of the formula

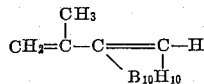

6. The method of claim 2 wherein the Lewis acid is aluminum trichloride, wherein the said compound is C-isopropenylvinylenedecaborane of the formula

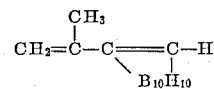

and wherein the inert hydrocarbon solvent is benzene.

7. Polymers of monomeric compounds of the class

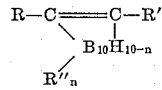

wherein R and R' are each selected from the class consisting of hydrogen, alkyl radicals, and alkenyl radicals, at least one of R and R' being an alkenyl radical and the total number of carbon atoms in R and R' being from 2 to 8, R'' is a lower alkyl radical and $n$ varies from 0 to 4.

8. Polymers of the monomeric compounds C-isopropenylvinylenedecaborane of the formula

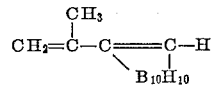

No references cited.

JOSEPH L. SCHOFER, *Primary Examiner.*

LEON D. ROSDOL, *Examiner.*

L. A. SEBASTIAN, J. W. WHISLER,
*Assistant Examiners.*